(12) United States Patent
Reisslein et al.

(10) Patent No.: US 8,090,256 B2
(45) Date of Patent: Jan. 3, 2012

(54) OPTICAL NETWORK ARCHITECTURES AND OPTICAL COMMUNICATION SCHEMES

(75) Inventors: Martin Reisslein, Tempe, AZ (US); Martin Maier, Verdun (CA); Martin Herzog, Montreal (CA)

(73) Assignee: Arizona Board of Regents, a body corporate of the State of Arizona, Acting for and on behalf of Arizona State University, Scottsdale, AZ (US)

(*) Notice: Subject to any disclaimer, the term of this patent is extended or adjusted under 35 U.S.C. 154(b) by 1030 days.

(21) Appl. No.: 11/867,470

(22) Filed: Oct. 4, 2007

(65) Prior Publication Data
US 2008/0131122 A1 Jun. 5, 2008

Related U.S. Application Data

(60) Provisional application No. 60/828,185, filed on Oct. 4, 2006.

(51) Int. Cl.
*G02F 1/00* (2006.01)
(52) U.S. Cl. .......... 398/3; 398/2; 398/4; 398/17; 398/59
(58) Field of Classification Search .................... 398/59, 398/61, 1–4, 10, 17; 370/224
See application file for complete search history.

(56) References Cited

U.S. PATENT DOCUMENTS

| | | | | |
|---|---|---|---|---|
| 5,903,370 A | * | 5/1999 | Johnson | 398/4 |
| 6,430,700 B1 | * | 8/2002 | Daruwalla et al. | 714/4.1 |
| 7,158,478 B1 | * | 1/2007 | Mazzurco et al. | 370/222 |
| 7,269,177 B2 | * | 9/2007 | Baker | 370/403 |
| 7,298,974 B2 | * | 11/2007 | Tanobe et al. | 398/63 |
| 7,302,176 B2 | * | 11/2007 | Sakano et al. | 398/5 |

(Continued)

FOREIGN PATENT DOCUMENTS
EP 1560457 A * 3/2005

OTHER PUBLICATIONS

A novel Star-ring protection architecture shceme for WDM passive optical access network. By Xiaofeng Sun, Zhaoxin Wanc, Chun-Kit Chan, sad Linn-Kuan Caen Department of Information Engineering, The Chinese University of Hong Kong, Shatin, Hong Kong: Issue Date: Mar. 6-11, 2005.*

(Continued)

*Primary Examiner* — Kenneth N Vanderpuye
*Assistant Examiner* — Hibret Woldekidan
(74) *Attorney, Agent, or Firm* — McDonnell Boehnen Hulbert & Berghoff LLP

(57) ABSTRACT

The present invention provides optical network methods and systems. In one example, a method for handling packets in a node coupled to a ring and star subnetwork may include (a) receiving in the given node a data packet on the ring subnetwork, (b) detecting a failure on the ring subnetwork, (c) determining a new transmission path to the destination node, and (d) sending the data packet along the new transmission path. In another example, an EPON may include (a) a root coupled to a ring and star subnetwork, (b) ONUs coupled to the root via a splitter/combiner and a first fiber link, (c) a second fiber link coupled to a subset of ONUs and the star subnetwork, and (d) a WDM coupler on the first fiber link that separates a first waveband of wavelengths from a second waveband of wavelengths and guides the first waveband to the star.

19 Claims, 6 Drawing Sheets

U.S. PATENT DOCUMENTS

| | | | |
|---|---|---|---|
| 7,366,109 B2 * | 4/2008 | Ashwood-Smith | 370/254 |
| 7,733,810 B2 * | 6/2010 | Denecheau et al. | 370/258 |
| 2002/0003640 A1 * | 1/2002 | Trezza | 359/120 |
| 2002/0118636 A1 * | 8/2002 | Phelps et al. | 370/222 |
| 2002/0144190 A1 * | 10/2002 | Bruckman | 714/43 |
| 2005/0084267 A1 | 4/2005 | Fan et al. | |
| 2007/0133533 A1 * | 6/2007 | Solomon et al. | 370/390 |
| 2008/0232803 A1 * | 9/2008 | Maier | 398/59 |

OTHER PUBLICATIONS

Xiaofeng et al(A novel Star-ring protection architecture shceme for WDM passive optical access network. By Xiaofeng Sun, Zhaoxin Wanc, Chun-Kit Chan, sad Linn-Kuan Caen Department of Information Engineering, The Chinese University of Hong Kong, Shatin, Hong Kong: Issue Date: Mar. 6-11, 2005).*

Xiaofeng et al(A novel Star-ring protection architecture shceme for WDM passive optical access network. By Xiaofeng Sun, Zhaoxin Wanc, Chun-Kit Chan, sad Linn-Kuan Caen Department of Information Engineering, The Chinese University of Hong Kong, Shatin, Hong Kong: Issue Date: Mar. 6-11, 2005).*

Alan et al. (Multiple-Star Wavelength-Router Network and Its Protection Strategy by Alan M. Hill, Mike Brierley, R. Michael Percival, Richard Wyatt, Danny Pitcher, Khairul M. Ibrahim Pati, Ian Hall, and Jean-Pierre Laude, Associate Member, IEEE Journal on Selected Areas in Communications, vol. 16, No. 7: Issue Date: Sep. 1998).*

Maier et al., (2007) "Stargate: The next evolutionary step towards unleashing the potential of WDM EPONs," IEEE Communications Magazine, 45(5):50-56.

Maier et al., (2005) "Protectoration: A fast and efficient multiple-failure recovery technique for resilient packet ring using dark fiber," Journal of Lightwave Technology, 23(10): 2816-2838.

Maier (May 2007) "Evolutionary Upgrades of Optical Access and Metro Networks" Keynote address) Proc., Optimization of Optical Networks (OON) workshop, Montreal, QC, Canada.

Shinohara (2005) "Broadband access in Japan: rapidly growing FTTH market," IEEE Commun. Mag, 43(9): 72-78.

Koonen (2006) "Fiber to the home/fiber to the premises: What, where, and when," Proc IEEE, 94(5): 911-934.

Davik, et al. (2004) "IEEE 802.17 Resilient packet ring tutorial, " IEEE Commun Mag, 42(3):112-118.

McGarry, et al. (2004) "Ethernet PONs: A survey of dynamic bandwith allocation (DBA) alogorithms," IEEE Commun Mag, 42(8): S8-S15.

McGarry, et al. (2006) "WDM Ethernet passive optical networks," IEEE Commun Mag, 44(2):S18-S25.

Herzog, et al. (2006) "Ringostar: An evolutionary performance—enhancing WDM upgrade of IEEE 802.17 resilient packet ring," IEEE Commun Mag, 44(2): S11-S17.

Green (2002) "paving the last mile with glass," IEEE Spectrum, 39(12):13-14.

Widjaja, et al. (2003) "Light core an intelligent edge for a flexible, thin-layered and cost-effective optical transport network," IEEE Commun Mag, 41(5):S30-S36.

Nuzman, et al. (2006) "Time domain wavelength interleaved networking with wavelength reuse," Proc IEEE INFOCOM.

IEEE, Resilient Packet Ring, IEEE Standard 802.17, Sep. 2004.

P. Yuan, - et al "The IEEE 802.17 media access protocol for high-speed metropolitan-area resilient packet rings," IEEE Network, vol. 18, No. 3, pp. 8-15, May/Jun. 2004.

G. Suwala and G. Swallow, "SONET/SDH-like resilience for IP networks: A survey of traffic protection mechanisms," IEEE Network, vol. 18, No. 2, pp. 20-25, Mar./Apr. 2004.

S. Spadaro, et al., "Positioning of the RPR standard in contemporary operator environments," IEEE Network, vol. 18, No. 2, pp. 35-40, Mar./Apr. 2004.

N. Ghani, et al., "Metropolitan optical networks," in Optical Fiber Telecommunications, vol. IVB. San Diego, CA: Academic, 2002, pp. 329-403.

A. A. M. Saleh and J. M. Simmons, "Architectural principles of optical regional and metropolitan access networks," J. Lightw. Technol., vol. 17, No. 12, pp. 2431-2448, Dec. 1999.

O. Gerstel and R. Ramaswami, "Optical layer survivability: A post-bubble perspective," IEEE Commun. Mag., vol. 41, No. 9, pp. 51-53, Sep. 2003.

T.-H Wu, "Emerging technologies for fiber network survivability," IEEE Commun. Mag., vol. 33, No. 2, pp. 58-74, Feb. 1995.

D. Zhou and S. Subramaniam, "Survivability in optical networks," IEEE Network, vol. 14, No. 6, pp. 16-23, Nov./Dec. 2000.

J. Zhang and B. Mukherjee, "A review of fault management in WDM mesh networks: Basic concepts and research challenges," IEEE Network, vol. 18, No. 2, pp. 41-48, Mar./Apr. 2004.

A. Carena, et al., "RingO: An experimental WDM optical packet network for metro applications," IEEE J. Sel. Areas Commun., vol. 22, No. 8, pp. 1561-1571, Oct. 2004.

P.-H. Ho and H. Mouftah, "Shared protection in mesh WDM networks," IEEE Commun. Mag., vol. 42, No. 1, pp. 70-76, Jan. 2004.

P-H Ho, et al. "On achieving optimal survivable routing for shared protection in survivable next-generation Internet," IEEE Trans. Rehab., vol. 53, No. 2, pp. 216-225, Jun. 2004.

G. Mohan and C. S. R. Murthy, "Lightpath restoration in WDM optical networks," IEEE Network, vol. 14, No. 6, pp. 24-32, Nov./Dec. 2000.

A. Narula-Tam, et al., "Physical topology design for survivable routing of logical rings in WDM-based networks," IEEE J. Sel. Areas Commun., vol. 22, No. 8, pp. 1525-1538, Oct. 2004.

C. Ou, et al. "New and improved approaches for shared-path protection in WDM mesh networks," J. Lightw. Technol., vol. 22, No. 5, pp. 1223-1232, May 2004.

S. Ramamurthy, et al., "Survivable WDM mesh networks," J. Lightw. Technol., vol. 21, No. 4, pp. 870-883, Apr. 2003.

M. Sridharan, et al., "A practical approach to operating survivable WDM networks," IEEE J. Sel. Areas Commun., vol. 20, No. 1, pp. 202-215, Jan. 2002.

D. Xu, et al., "Failure protection in layered networks with shared risk link groups," IEEE Network, vol. 18, No. 3, pp. 36- 41, May/Jun. 2004.

J. Wang, et al., "Path vs. subpath vs. link restoration for fault management in IP-over-WDM networks: Performance comparisons using GMPLS control signaling," IEEE Commun. Mag., vol. 40, No. 11, pp. 80-87, Nov. 2002.

Q. Zheng and G. Mohan, "Protection approaches for dynamic traffic in IP/MPLS-over-WDM networks," IEEE Commun. Mag., vol. 41, No. 5, pp. S24-S29, May 2003.

O. Gerstel and G. Sasaki, "Quality of Protection (QoP): A quantitative unifying paradigm to protection service grades," Opt. Netw. Mag., vol. 3, No. 3, pp. 40-50, May/Jun. 2002.

C. Saradhi, et al., "Differentiated QoS for survivable WDM optical networks," IEEE Commun. Mag., vol. 42, No. 5, pp. S8-S14, May 2004.

M. Tacca, et al. "Differentiated reliability in optical networks: Theoretical and practical results," J. Lightw. Technol., vol. 21, No. 11, pp. 2576-2586, Nov. 2003.

K. Wu, et al "Restoration schemes with differentiated reliability," in Proc. IEEE Int. Conf. Communications (ICC), Anchorage, AK, 2003, pp. 1968-1972.

O. Gerstel and R. Ramaswami, "Optical layer survivability: A services perspective," IEEE Commun. Mag., vol. 38, No. 3, pp. 104-113, Mar. 2000.

O. Gerstel and R. Ramaswami, "Optical layer survivability—An implementation perspective," IEEE J. Sel. Areas Commun., vol. 18, No. 10, pp. 1885-1899, Oct. 2000.

Y. Ye, et al., "On joint protection/restoration in IP-centric DWDM-based optical transport networks," IEEE Commun. Mag., vol. 38, No. 6, pp. 174-183, Jun. 2000.

A. Fumagalli and L. Valcarenghi, "IP restoration vs. WDM protection: Is there an optimal choice?" IEEE Network, vol. 14, No. 6, pp. 34-41, Nov./Dec. 2000.

W. Aiello, et al., "Augmented ring networks," IEEE Trans. Parallel Distrib. Syst., vol. 12, No. 6, pp. 598-609, Jun. 2001.

W. D. Grover and D. Stamatelakis, "Cycle-oriented distributed preconfiguration: Ring-like speed with mesh-like capacity for self-planning network restoration," in Proc. IEEE Int. Conf. Communications (ICC), Atlanta, GA, 1998, pp. 537-543.

G. Shen and W. D. Grover, "Extending the p-cycle concept to path segment protection for span and node failure recovery," IEEE J. Sel. Areas Commun., vol. 21, No. 8, pp. 1306-1319, Oct. 2003.

T. Y. Chow, et al., "Fast optical layer mesh protection using pre-cross-connected trails," IEEE/ACM Trans. Netw., vol. 12, No. 3, pp. 539-548, Jun. 2004.

P. Yue, et al., "High performance fair bandwidth allocation algorithm for resilient packet ring," in Proc. Int. Conf. Advanced Information Networking and Applications (AINA), Xian, China, Mar. 2003, pp. 415-420.

X. Zhou, et al., "Fairness algorithm analysis in resilient packet ring," in Proc. Int. Conf. Communication Technology (ICCT), Beijing, China, Apr. 2003, vol. 1, pp. 622-624.

V. Gambiroza, et al., "Design, analysis, and implementation of DVSR: A fair, high performance protocol for packet rings," IEEE/ACM Trans. Netw., vol. 12, No. 1, pp. 85-102, Feb. 2004.

I. Rubin and J. Ling, "All-optical cross-connect meshed-ring communications networks using a reduced number of wavelengths," in Proc. IEEE Information Communications (INFOCOM), New York, 1999, vol. 2, pp. 924-931.

A. M. Hill, et al., "Multiple-star wavelength-router network and its protection strategy," IEEE J. Sel. Areas Commun., vol. 16, No. 7, pp. 1134-1145, Sep. 1998.

* cited by examiner

OPTICAL NETWORK ARCHITECTURES AND OPTICAL COMMUNICATION SCHEMES

PRIORITY OF THE INVENTION

This application claims priority to U.S. Provisional Patent Application Ser. No. 60/828,185 filed Oct. 4, 2006, incorporated by reference herein in its entirety.

FIELD OF THE INVENTION

This invention relates to optical networking and optical communications, and in particular to improving network resiliency and recovery in the presence of network failures, as well as allowing all-optical communications across a network.

BACKGROUND OF THE INVENTION

In Metropolitan Area Networks (MANS) Wide Area networks (WANs) and the like, fiber optic rings are widely deployed. These rings typically use protocols that are neither optimized nor scalable to the demands of packet networks, including speed of deployment, bandwidth allocation and throughput, resiliency to faults, and reduced equipment and operational costs. The IEEE 802.17 Resilient Packet Ring Working Group (RPRWG) develops standards to support the development and deployment of Resilient Packet Ring (RPR) networks in Local, Metropolitan, and Wide Area Networks for resilient and efficient transfer of data packets at rates scalable to many gigabits per second. These standards build upon existing Physical Layer specifications, and develop new PHYs where appropriate. The two protection methods, wrapping and steering, used in the IEEE 802.17 Resilient Packet Ring (RPR) provide fast but very inefficient and limited network failure recovery. Due to the increased length of the backup path, RPR suffers from high traffic loss, a decreased throughput-delay performance, and the lack of resilience against multiple link and/or node failures.

Local area Network (LAN) implementations typically using Ethernet, are connected to nodes of ring networks. The Ethernet based passive optical networks (PONs) connected to nodes of a ring network undergo optical-electrical-optical (OEO) conversions, such conversions can act as a bottle-neck in systems, slowing down communications and potentially restricting usable bandwidth. It is desirable to connect PONs to the nodes of a ring network to allow all-optical communication, bypassing the OEO conversions.

Multimedia content distributed over existing communication networks are increasing at a rapid pace. The traffic characterization of such information is greedy and requires special processing in order to be transmitted over existing unreliable networks. Transmission of multimedia content over unreliable or congested networks can result in poor reconstructed media quality. While error resilience techniques have been proposed to partially overcome these problems, such techniques affect compression efficiency. One way to stream video is to encode a given video at a large number of different encoding rates, i.e., into different versions, and then to transmit the version with the highest rate that still fits into an available bandwidth. This approach of transmitting different encoded versions of the same video, also known as simulcast or bit stream switching, while simple, has a number of significant drawbacks. These include the need to encode an impractically large number of versions (on the order of several tens of versions are required to adapt a video encoded at one Megabit per second (Mbps) for transmission at a granularity of 100 kilobit per second (kbps)) and no flexibility to scale down the bit rate/video quality of a stream during network transport, unless typically complex and computationally demanding transcoding is performed at intermediate network nodes. Bitstream switching can also be applied over versions of different coding schemes, but an increase in the computational complexity of video decoding is inevitable.

It would be highly advantageous, therefore, to remedy the foregoing and other deficiencies inherent in the prior art.

SUMMARY OF THE INVENTION

In a first aspect, the present invention may provide a method for handling data in a given node of a plurality of nodes in a network, where the given node is coupled to a ring subnetwork and a star subnetwork, the method including (a) receiving in the given node data on the ring subnetwork, where the data is being sent from a source node to a destination node, (b) detecting a failure on the ring subnetwork, (c) determining a new transmission path to the destination node, where the new transmission path includes one or both of the ring subnetwork and the star subnetwork; and (d) sending the data along the new transmission path to the destination node.

In one example, the function of detecting a failure on the ring subnetwork may include determining that the data has undergone wrapping in the ring subnetwork. In this respect, the function of determining that the data has undergone wrapping in the ring subnetwork may then include (i) determining a source of the data, (ii) determining a destination of the data, and (iii) determining a direction on the ring subnetwork from which the data arrived.

In another example, the new transmission may include the star subnetwork.

In yet another example, the function of determining the new transmission path to the destination node may include recomputing a shortest path to the destination node taking the detected failure into account.

In still another example, the function of determining the new transmission path to the destination node may include detecting that the given node is disconnected from the star subnetwork and then determining that the new transmission path does not include the star subnetwork.

In another aspect, the method may include notifying the plurality of nodes in the network of the failure on the ring subnetwork. In yet another aspect, the method may include updating network topology information based on the detected failure on the ring subnetwork. In this respect, as one example, the network topology information may be maintained in a topology database.

In still another aspect, the method may include receiving in the given node a notification of a failure on the ring subnetwork and updating network topology information based on the notification. In another aspect, the method may include receiving in the given node a notification of a failure on the star subnetwork and updating network topology information based on the notification.

In a further aspect, the present invention may provide program instructions stored in data storage and executable by a processor to carry out functions described above.

In yet a further aspect, the present invention may provide a network node that includes (a) a first communication interface for communicating on a ring subnetwork, (b) a second communication interface for communicating on a star subnetwork, (c) data storage, (d) a processor, and (e) program instructions stored in the data storage and executable by the processor to carry out functions described above.

In one example, the data storage may include one or more ring queues for data communicated on the ring subnetwork, one or more star queues for data communicated on the star subnetwork, and one or more ring-star queues for data communicated between the ring subnetwork and the star subnetwork. In another example, the ring subnetwork may include a Resilient Packet Ring (RPR) network. In yet another example, the star subnetwork may include a single-hop WDM star network. In this respect, the single-hop WDM star network may include (i) at least one combiner coupled to the second communication interface, (ii) at least one splitter coupled to the second communication interface, (iii) a central hub comprising a wavelength router coupled in parallel with a star coupler, (iv) a waveband partitioner coupling the at least one combiner to the central hub and (v) a waveband departitioner coupling the at least one splitter to the central hub.

In still a further aspect, the present invention may provide a network that includes (a) a plurality of nodes, (b) a ring subnetwork coupled to the plurality of nodes, and (c) a star subnetwork coupled to a subset of the plurality of nodes, where the star subnetwork then includes (i) at least one combiner coupled to the subset of the plurality of nodes, (ii) at least one splitter coupled to the subset of the plurality of nodes, (iii) a central hub comprising a wavelength router coupled in parallel with a star coupler, (iv) a waveband partitioner coupling the at least one combiner to the central hub, and (v) a waveband departitioner coupling the at least one splitter to the central hub.

In yet a further aspect, the present invention may provide an Ethernet passive optical network (EPON) including (a) a root node comprising an optical line terminal (OLT), wherein the root node is coupled to a ring subnetwork and a star subnetwork, (b) a plurality of optical network units (ONUs), wherein the plurality of ONUs are coupled to the root node via an optical splitter/combiner and a first fiber link, (c) a second fiber link, wherein the second fiber link is coupled on a first end to a subset of the plurality of ONUs, and wherein the second fiber link is coupled on a second end to the star subnetwork, and (d) a WDM coupler coupled on the first fiber link between the OLT and the optical splitter/combiner, wherein the WDM coupler functions to separate a first waveband of wavelength channels from a second waveband of wavelength channels and responsively guide the first waveband of wavelength channels to the star subnetwork.

In one example, the WDM coupler may further function to forward the second waveband of wavelength channels to the OLT. In another example, the second fiber link may be one of a point-to-multipoint (P2MP) and a point-to-point (P2P) downstream fiber link. In yet another example, the second fiber link may carry downstream traffic from the star subnetwork to the subset of the plurality of ONUs. In a further example, the star subnetwork may include a wavelength router, and the first waveband of wavelength channels may include wavelength channels of the wavelength router.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION OF THE INVENTION

Figure 1:
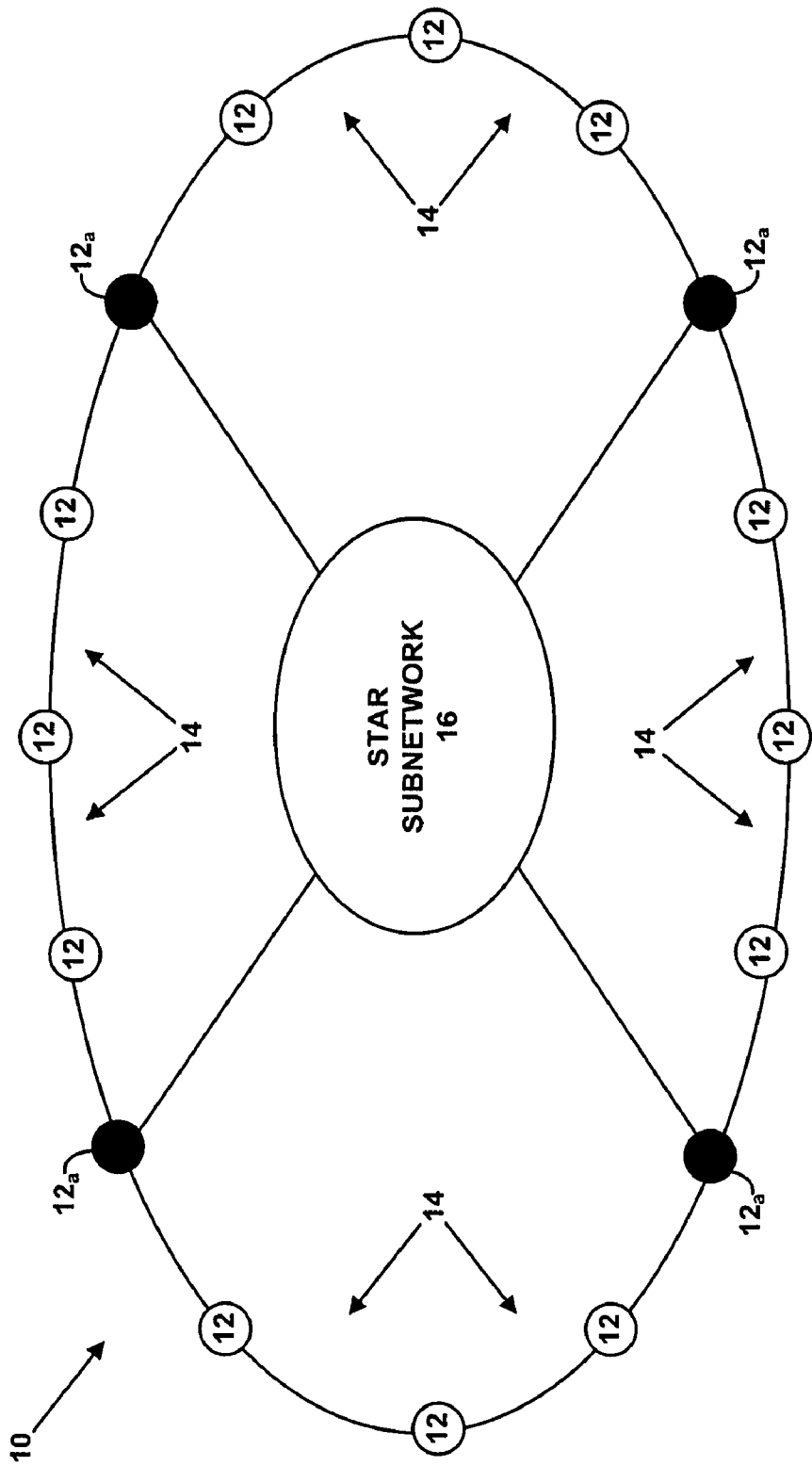
FIG. 1: Simplified block diagram of a network in which exemplary embodiments of the invention can be implemented.

Referring to the drawings, FIG. 1 is a simplified block diagram of a network 10 in which exemplary embodiments of the invention can be implemented. As shown, the network 10 may include a plurality of nodes 12 coupled in a ring subnetwork 14, and a subset of the nodes 12, known as ring/star nodes $12_a$, further coupled in a star subnetwork 16.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

The nodes 12 may take a variety of forms, depending on the type of ring subnetwork 14 and the type of star subnetwork 16. In general, each of the nodes 12 may be any device that is capable of sending and receiving data, preferably in the form of packets, in the ring subnetwork 14. In this respect, each of the nodes 12 may include, at a minimum, one or more transceivers and data storage. Additionally, each of the ring/star nodes $12_a$ may also be capable of sending and receiving data in the star subnetwork 16. In this respect, each of the ring/star nodes $12_a$ may further include additional transceivers and additional data storage for communicating over the star subnetwork 16. As one example, each of the nodes 12, including each of the nodes $12_a$, may be a gateway device that acts as an interface between the ring subnetwork 14 (or star subnetwork 16) and another network, such as a WAN (e.g., a long-haul backbone network), a MAN (e.g., a core or edge ring network), and/or a LAN (e.g., an Ethernet Passive Optical Network (EPON)). The nodes 12 may take other forms as well.

The ring subnetwork 14 may be a network that couples the nodes 12 together such that each node 12 connects to exactly two other nodes 12, thus forming a circular pathway for communication between the nodes 12 in the ring subnetwork 14. Preferably, the ring subnetwork 14 will be a bidirectional dual-ring fiber network, such as a Resilient Packet Ring (RPR) network. In this respect, each of the nodes 12 may be coupled to two different fiber rings, one carrying communication in a clockwise direction and one carrying communication in a counterclockwise direction. In turn, each of the nodes 12 may include different transceivers and data storage for each fiber ring in the ring subnetwork 14.

The star subnetwork 16 may then provide additional communication paths to the ring/star nodes 12a of the ring subnetwork 14. The star subnetwork 16 may be a network that couples each of the ring/star nodes $12_a$ to a central node. In turn, the nodes $12_a$ may then communication with each other via the central node. Preferably, the star subnetwork 16 will be a single-hop wavelength division multiplexing (WDM) star network that couples to the ring/star nodes $12_a$. In this respect, the star subnetwork 16 will preferably be implemented using dark fibers. Further, the ring/star nodes $12_a$ will preferably be equally spaced across the ring subnetwork 14. Advantageously, by coupling only a subset of the nodes 12 to the WDM star network, only that subset of nodes 12, namely the ring/star nodes $12_a$, will require WDM capabilities.

Figure 2:
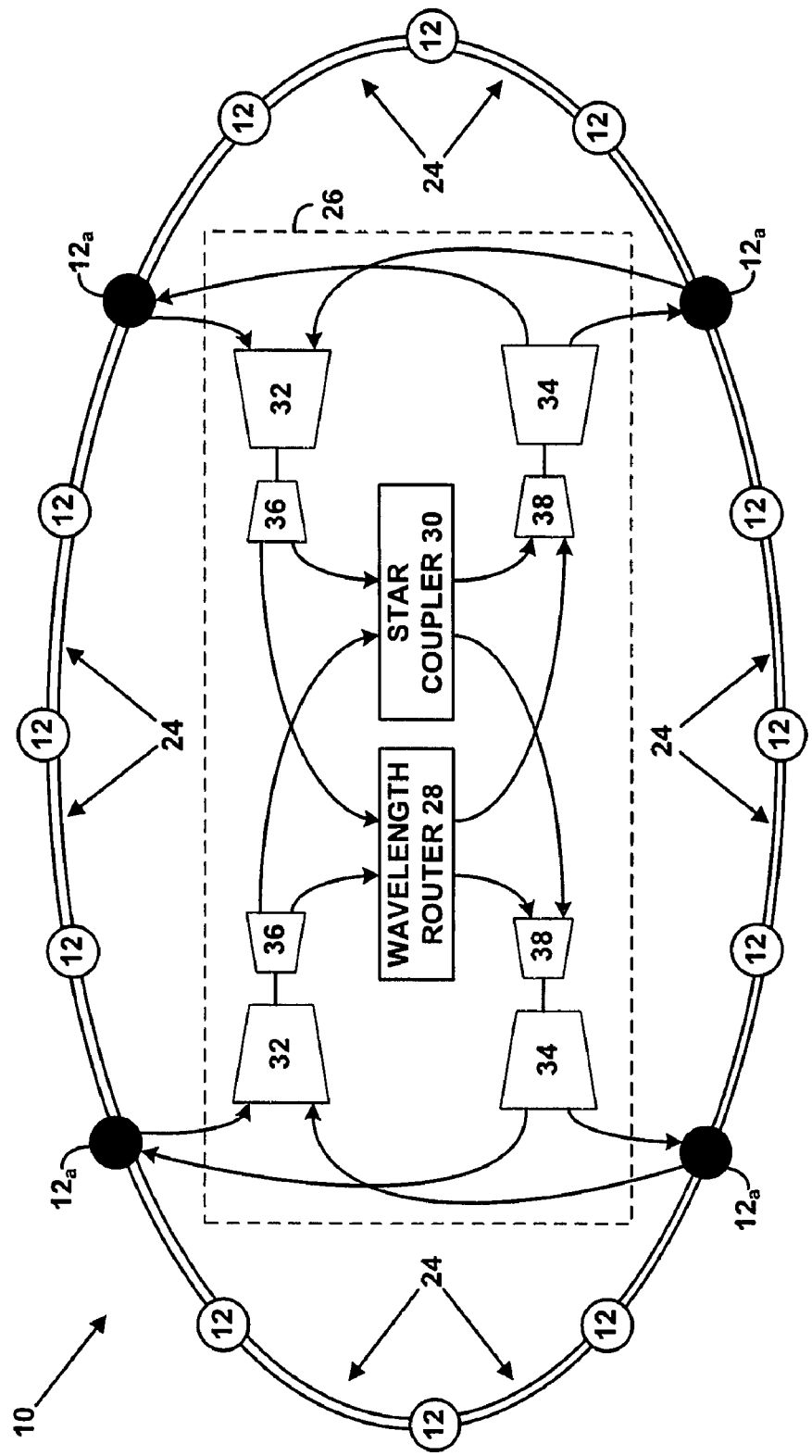
FIG. 2: Simplified block diagram of a first exemplary embodiment of the network of FIG. 1.

FIG. 2 is a simplified block diagram of a first exemplary embodiment of the network 10. In this first exemplary network 10, the ring subnetwork 14 will be an exemplary RPR network 24, and the star subnetwork 16 will be a first exemplary single-hop WDM star subnetwork 26.

In the exemplary RPR network 24, each fiber ring carries a single wavelength channel. Each node 12 my then include two fixed-tuned transmitters (FTs) and two fixed-tuned receivers (FRs), one for each fiber ring. Each node 12 may also include separate electrical transit and station queues for each ring, thus requiring the nodes 12 in the exemplary RPR network 24 to perform optical-electrical-optical (OEO) signal conversion. More particularly, for each ring, a node 12 may include at least one transit queue for in-transit packets, one transmission queue for locally generated data packets, one reception queue for packets destined for the local node, and one add_MAC queue for locally generated control packets. The nodes 12 will preferably give in-transit ring traffic priority over station traffic, such that in-transit packets are not lost due to buffer overflow.

The nodes 12 may broadcast packets in the RPR network 24 by source stripping and/or unidirectional/bidirectional flooding. With source stripping, a source node $12_s$ (i.e., a node that locally generates a packet for transmission on a network) may put a broadcast packet on a ring of the RPR network 24, and then take the broadcast packet from the ring after a round-trip propagation on the ring. With unidirectional/bidirectional flooding, the source node $12_s$ may put a broadcast packet on a ring, and other nodes may then take the broadcast packet from the ring based on the expiration of a time-to-live (TTL) field in the packet header.

Further, the nodes may communicate multicast and/or unicast packets on the RPR network 24 by destination stripping. With destination stripping, a source node $12_s$ may put a packet on a ring, and a destination node $12_d$ (a node that is an intended recipient of a packet, as determined by the source node) may then remove the packet from the ring. Further yet, when sending multicast and/or unicast packets, a source node $12_s$ may also employ shortest path routing (i.e., best direction routing), which enables the source node $12_s$ to select which fiber ring (and corresponding direction) a packet should be sent on. In this respect, the source node $12_s$ will likely select the fiber ring that provides the shortest transmission path to the destination node $12_d$ (i.e., a path along which data may travel to the destination node). Advantageously, the use of destination stripping and shortest path routing in the RPR network 24 may improve the spatial reuse of bandwidth on the rings. However, in the RPR network 24, packets may still need to traverse multiple intermediate nodes on a ring before reaching a destination node $12_d$, thus consuming more bandwidth than other networks.

The exemplary RPR network 24 may employ two methods of protection against network failure (e.g., a node failure and/or a link failure): (1) wrapping and (2) steering. With wrapping, upon detection of a failure, the two ring nodes 12 adjacent to the failure may switch all packets arriving on a first ring to a second ring, such that the packets will reach a destination node $12_d$ on the second ring (and in the opposite direction). Thus, the two ring nodes 12 adjacent to the failure "wrap" all packets away from a failed link or node. With steering, after learning about a failure, a given source node $12_s$ may steer packets away from the failure by injecting packets on a ring in a direction opposite to the link or node failure. However, while these protection methods provide the RPR network 24 with resilience against single link or node failures, these protection methods also have disadvantages. First, these protection techniques may result in a rather inefficient use of bandwidth resources, because packets may travel along much longer transmission paths before reaching a destination node. Further, these protection methods may only protect the RPR network 24 against a single link or node failure. If multiple failures occur in the RPR network 24, the RPR network 24 may be divided into two or more disjoint sub-rings and the full connectivity of the RPR network 24 may be lost.

The first exemplary single-hop WDM star subnetwork 26 may overcome some of the disadvantages of the exemplary RPR network 24. As shown, the first exemplary single-hop WDM star subnetwork 26 may include at its core a wavelength router 28 coupled in parallel with a star coupler 30, which may function as the central hub of the first exemplary single-hop WDM star subnetwork 26. Additionally yet, the first exemplary single-hop WDM star subnetwork 26 may also include one or more combiners 32, one or more splitters 34, one or more waveband partitioners 36, and one or more waveband departitioners 38. Additionally yet, the exemplary WDM star subnetwork 26 may also include other elements, such as optical amplifiers (not shown). For purposes of illustration, the first exemplary single-hop WDM star subnetwork 26 in FIG. 2 includes two combiners 32, two splitters 34, two waveband partitioners 36, and two waveband departitioners 38.

The wavelength router 28 will preferably be a D×D arrayed-waveguide grating (AWG) with D input ports and D output ports (D≧1). For example, without limitation, the wavelength router 28 may be a 2×2 AWG. In the 2×2 AWG, multiple wavelengths may be fed into each AWG input port. On each input port, the AWG may route every second wavelength of an incoming signal to the same output port. This period of the wavelength response may be called free spectral range (FSR). As such, in this example, there may be two FSRs each containing two wavelengths. More generally, the FSR of a D×D AWG may consist of D contiguous wavelengths (i.e., the physical degree of an AWG is identical to the number of wavelengths per FSR). The D×D AWG routes wavelengths such that no collisions occur at the AWG output ports, and as such each wavelength can be applied at all AWG input ports simultaneously. In other words, the D×D AWG may spatially reuse each wavelength channel D times. Further, each FSR provides one wavelength channel for communication between a given pair of AWG input and output ports. In this respect, R FSRs may allow for R simultaneous transmissions between each AWG input-output port pair, and the total number of wavelength channels available at each AWG port may be represented as R·D.

The star coupler 30 will preferably be a D×D passive star coupler (PSC) with D input ports and D output ports (D≧1). The PSC may function to collects wavelength channels from all D input ports and equally distribute the wavelength channels to all D output ports. In the PSC, a given wavelength channel can be received at all D output ports, but a given wavelength channel can be used only at one of the D input ports at any time to avoid channel collisions at the output ports of the PSC.

As noted above, the wavelength router 28 and the star coupler 30 may be coupled in parallel to form a central hub for the first exemplary single-hop WDM star subnetwork 26. In this respect, each ring/star node $12_a$ may have a unique wavelength channel (i.e., a home channel) on the star coupler 30, over which the ring/star node $12_a$ receives data transmitted in the star coupler 30. Additionally, the star coupler 30 may also employ a control wavelength channel.

As such, the star coupler 30 waveband (i.e., grouping of wavelength channels) may include D·S+1 wavelength channels, where D·S represents the number of ring/star nodes $12_a$. Further, the wavelength router 28 waveband may include D·R contiguous data wavelength channels, where R represents the number of used FSRs of the D×D AWG (R≧1). Therefore, the first exemplary single-hop WDM star subnetwork 26 may include a total number of contiguous wavelength channels Λ that is equal to sum of the wavelength channels in the star coupler waveband and the wavelength router waveband.

The contiguous wavelength channels of the first exemplary single-hop WDM star subnetwork 26 may be used for control packets and/or data packets. In this respect, each wavelength channel may be time divided into frames that are repeated periodically. Each frame may include F slots, where F is greater than or equal to the number of ring/star nodes $12_a$ (represented as D·S). One frame slot will preferably be equal to the transmission time of a control packet.

The first exemplary single-hop WDM star subnetwork 26 may use all home channels of the star coupler 30 and all wavelength channels of the wavelength router 28 waveband for data packet transmission. However, the first exemplary single-hop WDM star subnetwork 26 may not statically assign these data wavelength channels to the ring/star nodes $12_a$. Instead, access to the data wavelength channels may be arbitrated by ring/star nodes 12 a broadcasting control packets on the control wavelength channel of the star coupler 30 prior to transmitting data packets. The ring/star nodes $12_a$ may send these control packets on the control wavelength channel during the first D·S slots of each frame. In this respect, each of the D·S slots of the control wavelength channel may be dedicated to a different ring/star node $12_a$, such that channel collisions of control packets are avoided. The remaining slots of each frame, which may be represented as (F–D·S), may then be used for transmission of data packets on the control wavelength channel, and these data packets would be received by all ring/star nodes $12_a$. As such, these remaining slots on the control wavelength channel may allow for broadcasting in the first exemplary single-hop WDM star subnetwork 26.

The combiners 32 may each be an S×1 combiner with S input ports and one output port (S≧1). The combiners 32 may function to collect wavelength channels from all S input ports and combine them onto a common output port. To avoid channel collisions at the output port of the combiner, however, the collected wavelength channels must be different. Thus, a given wavelength channel can be used only at one of the S input ports at any time.

The splitters 34 may each be a 1×S splitter with one input port and S output ports (S≧1). The splitters 34 may function to equally distribute all incoming wavelength channels to all S output ports. In this respect, a given wavelength channel can be received at all S output ports of the splitters 34.

The waveband partitioners 36 may each have one input port and two output ports. The waveband partitioners 36 may function to partition an incoming set of Λ contiguous wavelength channels into two wavebands (subsets of wavelength channels) of Λa and Λb contiguous wavelength channels, (1≦Λa, Λb≦Λ and Λ=Λa+Λb). The waveband partitioners 36 may then route each waveband to a different output port.

The waveband departitioners 38 may each have two input ports and one output port. The waveband departitioners 38 may function to collect two different wavebands consisting of Λa and Λb contiguous wavelength channels from the two input ports respectively. The waveband departitioners 38 may then launch the combined set of Λ wavelength channels onto the common output port (1≦Λa, Λb≦Λ and Λ=Λa+Λb).

As shown in FIG. 2, an output of S ring/star nodes $12_a$ may be coupled to an input of a S×1 combiner 32. In turn, the output of the combiner 32 may be coupled to the input of a waveband partitioner 36. The two outputs of the waveband partitioner 36 may then couple to the central hub, which consists of the wavelength router 28 in parallel with the star coupler 30. The central hub may then couple to the two inputs of a waveband departitioner 38. In turn, the output of the waveband departitioner 38 may couple to the input of a 1×S splitter 34. Each output of the splitter 34 may then couple to the S ring/star nodes $12_a$. A total of D of these arrangements, each consisting of a combiner 32, a waveband partitioner 36, a waveband departitioner 38, and a splitter 34, may be used to connect all D·S ring/star nodes $12_a$ to the central hub.

In the above arrangement, S ring/star nodes $12_a$ may transmit signals on Λ wavelength channels over S distinct fibers to an S×1 combiner 32, which may combine the signals onto the Λ wavelength channels of one fiber leading to a waveband partitioner 28. The waveband partitioner 36 may partition the set of Λ wavelengths into the wavelength router 28 and star coupler 30 wavebands, which are fed into a wavelength router input port and a star coupler input port, respectively. The signals from the opposite wavelength router output port and a star coupler output port are then collected by a waveband departitioner 38. In turn, the waveband departitioner 38 sends the signals to a 1×S splitter 34, which equally distributes the signals to the S ring/star nodes $12_a$.

Referring to FIGS. 1 and 2, the operation of the network 10 without failures will now be described. In general, each of the nodes 12 in the network 10 will preferably send data packets on the shortest path to a given destination node, which may include the ring subnetwork 14 and/or the star subnetwork 16. The shortest path between a source node and a destination node may be defined by a number of hops, where a hop is the distance between two adjacent nodes (e.g., two neighboring nodes on the ring subnetwork 14 or two nodes connected to via the star subnetwork 16).

Prior to sending a data packet, a source node $12_s$ on the network 10 may first determine a shortest path to a given destination node $12_d$. The source node $12_s$ may make this determination based on its knowledge of the topology of the network (e.g., nodes and links), which the source node $12_s$ may obtain via the RPR topology discovery protocol. The RPR topology discovery protocol may provide a reliable and accurate means for all network nodes 12 to discover the topology (number and ordering) of the nodes on the ring network and any changes to that topology due to link/node failures and added/disconnected nodes. According to the RPR topology discovery protocol, each node 12 may broadcast topology and protection (TP) control packets on both rings of the ring subnetwork 14 by means of source stripping. The nodes 12 may send these TP control packets periodically and/or when triggered by protection-state changes. Each node 12 may use received TP control packets to build and update a topology database. In turn, the topology database may be used by the MAC control entity to compute a complete topology image and determine the shortest path. As such, the topology database may enable each node 12 to calculate the number of hops to all the remaining nodes 12 on the network 10.

The shortest path between the source node 12, and the destination node 12$_d$ may include the ring subnetwork 14 and/or the star subnetwork 16. For example, if the source node 12$_s$ and the destination node 12$_d$ are relatively close to each other on the ring subnetwork 14, the shortest path may be entirely along a given ring of the ring subnetwork 14. Alternatively, if the source node 12$_s$ and the destination node 12$_d$ are further apart on the ring subnetwork 14, the shortest path may be include the ring subnetwork 14 as well as the star subnetwork 16. Alternatively yet, if both the source node 12$_a$ and the destination node 12$_d$ are ring/star nodes 12$_a$, then the shortest path may be entirely along the star subnetwork 16.

After determining the shortest path to the given destination node 12$_d$, the source node 12$_s$ may then send the data packets along that shortest path. In this respect, if the shortest path is entirely along a given ring of the ring subnetwork 14, all intermediate nodes 12 along the shortest path, including the ring/star nodes 12$_a$, may forward the data packets along the given ring. Alternatively, if the shortest path includes the star subnetwork 16, the ring/star node 12$_a$ closest to the source node 12, may receive the data packets and then perform proxy stripping. More particularly, the ring/star nodes 12$_a$ may determine that the shortest path of the data packets includes the star subnetwork 16, and the ring/star node 12$_a$ may then pull the data packets from the ring subnetwork 14. In turn, the ring/star node 12$_a$ closest to the source node 12, may send the data packets across the star subnetwork 16 to the ring/star node 12$_a$ closest to the destination node 12$_d$.

A method of sending traffic on the exemplary single hop WDM star subnetwork 26 depicted FIG. 2 will now be described in more detail. A ring/star node 12$_a$ may first select a data packet for transmission over the exemplary single hop WDM star subnetwork 16. The data packet may be an in-transit data packet from a source node 12, on the ring subnetwork 14, or the data packet may be a locally generated packet. The ring/star nodes 12$_a$ will preferably give in-transit data packets priority over locally generated packets. This selection process may be handled by scheduling algorithms in the ring/star node 12$_a$.

After selecting the data packet for transmission, the ring/star node 12$_a$ may broadcast a control packet in its assigned slot of an upcoming frame on the control wavelength channel of the exemplary single hop WDM star subnetwork 26. The control packet may include a destination address of the ring/star node 12$_a$ closest to destination node 12$_d$, a length of a corresponding data packet (e.g., L time slots), and/or a priority of the corresponding data packet. After announcing the data packet in its assigned control slot, the ring/star node 12$_a$ may then transmit the corresponding data packet on the home channel of the addressed ring/star node 12$_a$ in the subsequent L time slots. Preferably, the sending ring/source node 12$_a$ will send the data packets within the same frame as the corresponding control packet, and as such the data packets will preferably have a maximum length of (F–D·S) slots.

After an end-to-end propagation delay of the star coupler 30 of the exemplary single hop WDM star subnetwork 26, all ring/star nodes 12$_a$ may receive the broadcast control packet from the sending ring/star node 12$_a$ over the control wavelength channel. The receiving ring/star node 12$_a$ may then receive the data packet by tuning to its home channel. However, if one or more other ring/star nodes 12$_a$ have transmitted data packets on the receiving ring/star node's home channel in at least one of the aforementioned L slots, the data packets may be corrupted due to (channel) collision. In this respect, the sending ring/star node 12$_a$ may then have to retransmit the data packets, as described below.

Due to the dedicated access control of the control wavelength channel, collisions of control packets are prevented. As such, the sending ring/star node 12$_a$ may not have to retransmit any control packets. Instead, each ring/star node 12$_a$ may determine which transmitted data packets have experienced channel collision based on the previously (successfully) transmitted control packets. More particularly, each ring/star node 12$_a$ may determine whether a transmitted data packet has collided based on the control slot in which the corresponding control packet was sent, the destination address indicated in the control packet, and/or the length indicated in the control packet. Sending ring/star nodes 12$_a$ retransmit collided data packets on a wavelength router 28 wavelength channel, as opposed to a star coupler 30 wavelength channel. The ring/star nodes 12$_a$ may rely on the control slot and the destination field of the transmitted control packet to determine the appropriate wavelength channels of the wavelength router 28 for a single-hop connection between the sending ring/star node 12$_a$ and the receiving ring/star node 12$_a$. The actual retransmissions on the chosen wavelength channels are then scheduled in a distributed fashion by all ring/star nodes 12$_a$.

After the receiving ring/star node 12$_a$ successfully receives a given data packet from the star subnetwork 16 (e.g., either on its home channel or on a wavelength router wavelength channel during retransmission), the receiving ring/star node 12$_a$ may then store the data packet and/or forward the data packet on the ring subnetwork 14 to the destination node 12$_d$. In turn, the destination node 12$_d$ may receive the data packet on the ring subnetwork 14 and then take the data packet from the ring.

Referring again to FIGS. 1 and 2, the operation of the network 10 with failures, and a protection/restoration method known as "protectoration," will now be described. The protectoration method builds on the wrapping and steering protection methods of RPR networks, as described above. Further, the protectoration method may provide RPR networks with resilience against multiple link and/or node failures.

As described above, a source node 12$_s$ will preferably send data packets to a given destination node 12$_d$ along the shortest transmission path (i.e., the path with the least amount of hops). In this respect, a source node 12$_s$ may send data packets intended for a given destination node 12$_d$ to the source node's closest ring/star node 12$_{as}$. In turn, that ring/star node 12$_{as}$ may perform proxy-stripping by forwarding the data packets across the star subnetwork 16 to the ring/star node 12$_{ad}$ closest to the destination node 12$_d$. That ring/star node 12$_{ad}$ may then forward the data packets on a first ring of the ring subnetwork 14 towards the destination node 12$_d$. However, upon detection of a failure on the ring subnetwork 14 (e.g., a link or node failure), an intermediate node 12 on the ring subnetwork 14 adjacent to the failure may perform wrapping on the data packets. In turn, the ring/star node 12$_{ad}$ closest to the destination node 12$_d$ may receive the wrapped data packets, which the ring/star node 12$_{ad}$ had previously forwarded to the destination node 12$_d$, on a second ring of the ring subnetwork 14.

After receiving the wrapped data packets, the ring/star node 12$_{ad}$ operating according to the protectoration method may perform proxy-stripping on the wrapped data packets, as opposed to forwarding the wrapped data packets back to the source node 12$_s$ on the ring subnetwork 14 (as done in conventional RPR). More particularly, after receiving the wrapped data packets, the ring/star node $12_{ad}$ may first detect a failure on the ring subnetwork 14. In this respect, the ring/star node $12_{ad}$ may detect a ring failure by determining that received data packets have undergone wrapping on the ring subnetwork 14. For example, the ring/star network $12_{ad}$ may determine that the received data packets have undergone wrapping based on the source and destination addresses included in the data packets, as well as the direction from which the ring/star node $12_{ad}$ received the data packets.

Once the ring/star node $12_{ad}$ detects the failure on the ring subnetwork 14, the ring/star node $12_{ad}$ may determine a new transmission path to the destination node $12_d$. In this respect, the ring/star node $12_{ad}$ may recompute the shortest path to the destination node $12_d$ taking the link failure into account. In one example, the ring/star node $12_{ad}$ may recompute the shortest path to the destination node $12_d$ based on the ring/star node's knowledge of the network topology (i.e., an arrangement of elements (e.g., links, nodes, etc.) in the network), which the ring/star node $12_{ad}$ may maintain in a topology database. The new transmission path to the destination node $12_{ad}$ may include the ring subnetwork 14 and/or the star subnetwork 16. In a preferred example, the new transmission path will include the star subnetwork 16 and a backup ring/star node $12_{ab}$ that is the next closest ring/star node $12_a$ to the destination node $12_d$. Typically, this next closest ring/star node $12_a$ will be located in the ring subnetwork 14 on the opposite side of the ring failure.

After determining the new transmission path to the destination node $12_d$, the ring/star node $12_{ad}$ may then send the wrapped data packets along the new transmission path towards the destination node $12_d$. In this respect, if the new transmission path includes the star subnetwork 16, the backup ring/star node $12_{ab}$ may receive the wrapped data packets from the ring/star node $12_{ad}$, and the backup ring/star node $12_{ab}$ may then forward the wrapped data packets to the destination node on the ring subnetwork 16.

After the failure on the ring subnetwork 14 has been detected, the ring/star node $12_{ad}$ and/or the nodes 12 adjacent to the failure may also notify the other nodes 12 in the network 10 of the failure on the ring subnetwork 14. In this respect, the ring/star node $12_d$ and/or the nodes 12 adjacent to the failure may broadcast control packets, such as RPR topology discovery protocol TP control packets, that notify the other nodes 12 of the failure. These control packets may travel on the ring subnetwork 14 and/or the star subnetwork 16.

In turn, the other nodes 12 of the network 10 may receive the notification of the failure on the ring subnetwork 14. In response, each node 12 may then update its network topology information based on the notification. For example, if the nodes 12 maintain a topology database, the nodes 12 may update that topology database.

After the nodes 12 update their network topology information to take the failure into account, the nodes 12 may send all future data packets along transmission paths that do not include the failure. For example, after learning about the failure, the source node $12_s$ and its closest ring/star node $12_{as}$ may transmit future data packets to the destination node $12_d$ along a path that includes the star subnetwork 16 and the backup ring/star node $12_{ab}$, as opposed to the ring/star node $12_{ad}$ closest to the destination node $12_d$. Further, if the ring failure is a ring/star node $12_a$ failure, additional processing by other ring/star nodes $12_a$ may be necessary. More particularly, ring/star nodes $12_a$ neighboring the failed ring/star node $12_a$ may take over the failed ring/star node's role of proxy-stripping regular traffic and steering wrapped traffic.

It should also be understood that multiple failures, such as multiple link and/or node failures, may also occur on the ring subnetwork 14. In this respect, the network nodes 12 may use the star subnetwork 16 to bypass the failures according to the protectoration method described above. More particularly, if the ring/star node $12_a$ detects multiple failures on the ring subnetwork 16, the ring/star node $12_a$ may take these multiple failures into account when recalculating the shortest route to the destination node $12_d$. Further, after the multiple failures are detected, each node 12 may update its network topology information to reflect the multiple failures, such that all future data packets are steered away from the multiple failures via the star subnetwork 16. Accordingly, with an intact star subnetwork 16, multiple link and/or node failures on the ring subnetwork 16 may occur simultaneously without losing full connectivity. However, this full connectivity with multiple failures may only be guaranteed if no more than one failure occurs between each pair of ring/star nodes $12_a$. Otherwise, one or more nodes 12 between a given pair of ring/star nodes $12_a$ may be disconnected from the network 10.

In addition or in alternative to the ring subnetwork 14 failure(s) described above, failures may also occur on the star subnetwork 16. These star subnetwork 16 failures may include fiber cuts and nonfunctional network devices such as failed combiners/splitters, waveband (de)partitioners, wavelength routers, star couplers, and/or amplifiers. Depending on the failure, only one, a subset, or all ring/star nodes $12_a$ may be disconnected from the star subnetwork 16. For example, a fiber cut between a given ring/star node and a combiner/splitter port to which it is attached may disconnect only the given ring/star node $12_a$ from the star subnetwork 16. As another example, if a given combiner/splitter, amplifier, waveband (de)partitioner, or any fiber between these devices fails, all S corresponding ring/star nodes $12_a$ may be disconnected from the star subnetwork 16. As yet another example, if the central hub (wavelength router and star coupler) fails, the connectivity of the star subnetwork 16 may entirely lost, reducing the network 10 to a conventional ring network.

When a given ring/star node $12_a$ is disconnected from the star subnetwork 16 as a result of any of the failures above (which may occur before, during, and/or after a transmission from a source node to a destination node), the ring/star node $12_a$ may first detect that it has been disconnected from the star subnetwork 16. For example, the ring/star node $12_a$ may determine that it is unable to send and receive traffic to and from the star subnetwork 16. After detecting the disconnection, the affected ring/star node $12_a$ may notify the other nodes that the ring/star node $12_a$ is disconnected from the star subnetwork 16. For example, the ring/star node $12_a$ may broadcast a control packet, such as an RPR topology discovery protocol TP control packet, that notifies the other nodes 12 of the disconnection. Thereafter, the ring/star node $12_a$ may update its network topology information to reflect the disconnection, and the ring/star node $12_a$ may then subsequently act as a conventional node on the ring subnetwork 14.

Advantageously, the interconnection of the ring subnetwork 14 and the star subnetwork 16, along with the protectoration method described above, may provide full network connectivity in the event of multiple link and/or node failures. In this respect, the ring subnetwork 14 may be divided into several segments, each including the nodes 12 between two adjacent ring/star nodes $12_a$. Each segment is then able to recover from a single link or node failure without losing full connectivity of the network. Thus, the number of fully recoverable link and/or node failures may be identical to the number of ring/star nodes $12_a$ (provided that there is no more than one failure in each segment).

According to the protectoration method, the ring/star node $12_a$ may deploy not only proxy stripping but also steering of the wrapped data packets. As a result, the wrapped data packets may travel along a single-hop path to another ring/star node $12_{ab}$ that is close to the destination node $12_d$, as opposed to traveling along the ring subnetwork 14 all the way back to the source node $12_s$ before reaching the destination node $12_d$ (which includes a round trip between source and destination nodes and long secondary path to the destination node). Further, as a result, the ring/star node $12_a$ may restore the network connectivity in a more efficient manner, and the source node $12_s$ may steer future data packets to the destination node $12_d$ along an updated shortest path that includes the star subnetwork 16 (and is likely shorter than the secondary path on the ring subnetwork). In turn, the wrapped and steered data packets may consume significantly fewer bandwidth resources on the ring subnetwork 14, resulting in a more efficient use of bandwidth. Accordingly, protectoration, which is multiple-failure recovery technique, may combine the fast recovery time of protection (wrapping) and the bandwidth efficiency of restoration (steering together with proxy stripping).

Figure 3:
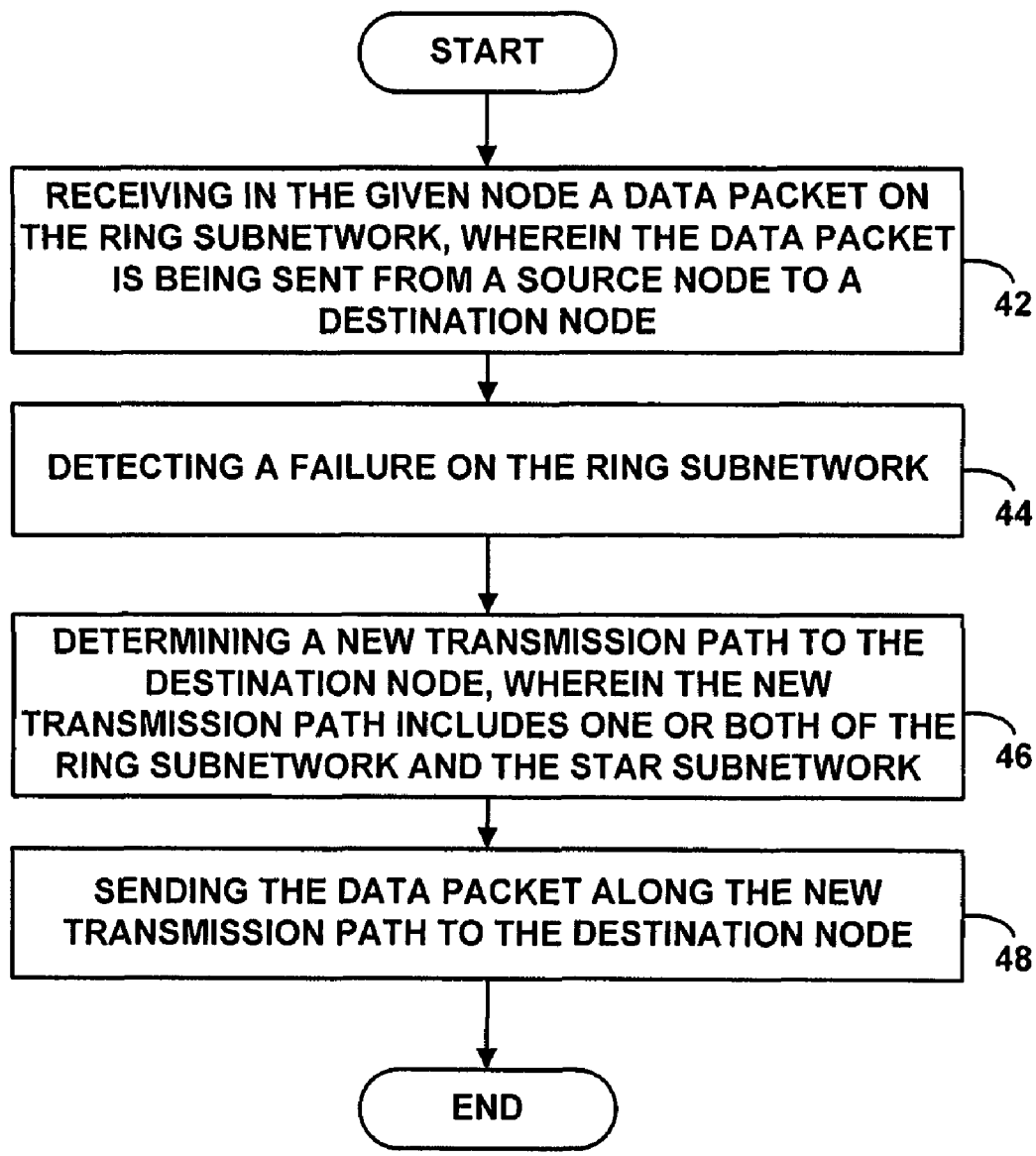
FIG. 3: Flow chart depicting a method for handling packets in a node coupled to a ring subnetwork and a star subnetwork.

FIG. 3 is a flow chart depicting a method for handling data in a given node. In a preferred example, the given node will be one of the ring/star nodes $12_a$, such as the ring/star node $12_{ad}$ described above. In one example, the following method may be carrier out by program instructions stored in data storage and executable by a processor (i.e., (i.e., a machine readable storage medium including a set of program instructions).

In one example, the method may be carried out in a given node that is coupled to a ring subnetwork and a star subnetwork. In another example, the method may involve coupling the given node to a ring subnetwork and a star subnetwork. In either case, the ring subnetwork may be the ring subnetwork 14 and star subnetwork may be the star subnetwork 16.

At step 40, the method may then involve receiving in the given node data on the ring subnetwork, wherein the data is being sent from a source node (e.g., the node $12_s$) to a destination node ($12_d$). At step 42, the method may then involve detecting a failure on the ring subnetwork. For example, detecting a failure on the ring subnetwork 14 may include determining that the data has undergone wrapping in the ring subnetwork 14. In this respect, the method may further include determining a source of the data, determining a destination of the data, and/or determining a direction on the ring subnetwork from which the data arrived.

At step 46, after detecting the failure, the method may involve determining a new transmission path to the destination node which includes one or both of the ring subnetwork and the star subnetwork. In one preferred example, the new transmission path will include the star subnetwork. In another example, determining a new transmission path to the destination node may involve recomputing a shortest path to the destination node taking the detected failure into account. An yet another example, determining a new transmission path to the destination node may involve detecting that the given node is disconnected from the star subnetwork and then determining that the new transmission path does not include the star subnetwork.

At step 48, after determining the new transmission path, the method may involve sending the data along the new transmission path to the destination node.

Additionally, the method may involve steps for keeping network topology information current. For example, after detecting the failure, the method may involve (i) notifying nodes (e.g., the nodes 12) of the failure on the ring subnetwork and/or (ii) updating network topology information based on the detected failure on the network. In this respect, the network topology information may be maintained in a topology database. As another example, the method may involve receiving in the given node a notification of a failure on the ring network and updating network topology information based on the notification. As yet another example, the method may involve receiving in the given node a notification of a failure on the star subnetwork and updating network topology information to reflect the disconnection from the star subnetwork.

Figure 4:
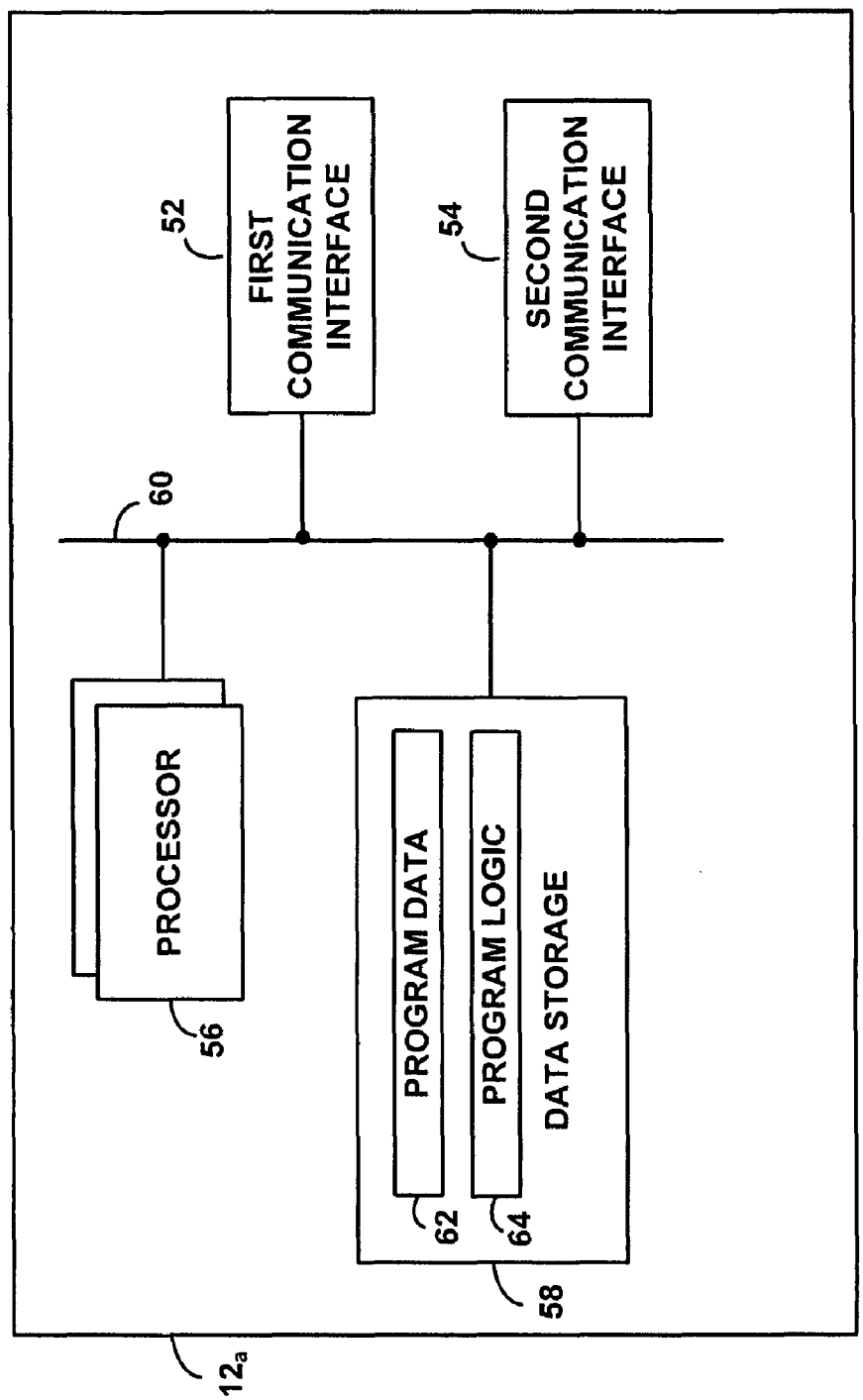
FIG. 4: Simplified block diagram of an exemplary node coupled to a ring subnetwork and a star subnetwork, showing functional components that can operate to carry out aspects of the exemplary embodiment.

FIG. 4 is a simplified block diagram of an exemplary ring/star node $12_a$, showing functional components that can operate to carry out aspects of the exemplary embodiment. As shown, the exemplary ring/star node $12_a$ may include a first communication interface 52, a second communication interface 54, a processor 56, and data storage 58, all linked together via a system bus, network, or other connection mechanism 90.

Referring to FIG. 4, the first communication interface 52 may communicatively couple the exemplary ring/star node $12_a$ to ring subnetwork 14. As such, the first communication interface 52 may include at least two optical transmitters and two optical receivers, one for each fiber ring of the ring subnetwork 14. Preferably, the optical transmitters and receivers will be fixed-tuned transmitters and receivers that operate at a single wavelength channel.

The second communication interface 54 may communicatively couple the exemplary ring/star node $12_a$ to the star subnetwork 14. As such, the second communication interface 54 may include at least one optical transmitter and one optical receiver for communicating on the star subnetwork 16. In a preferred example, the second communication interface 54 may include (i) a fixed tuned transmitter and receiver for communicating over a control wavelength channel of the star subnetwork 16 and (ii) a tunable transmitter and receiver for communicating over the remaining wavelength channels of the star subnetwork 16. Additionally, the second communication interface 54 may include an additional fixed tuned receiver for receiving packets over a home channel of the star subnetwork 16. The second communication interface may take other forms as well.

The processor 56 may comprise one or more general purpose microprocessors and/or dedicated signal processors. (The term "processor" encompasses either a single processor or multiple processors that could work in combination.) Data storage 58, in turn, may comprise memory and/or other storage components, such as optical, magnetic, organic or other memory or disc storage, which can be volatile and/or non-volatile, internal and/or external, and integrated in whole or in part with the processor 56. Data storage 58 preferably contains or is arranged to contain (i) program data 62 and (ii) program logic 64. Although these components are described herein as separate data storage elements, the elements could just as well be physically integrated together or distributed in various other ways. In a preferred example, the program data 62 would be maintained in data storage 58 separate from the program logic 64, for easy updating and reference by the program logic 64.

Data storage 58 may include one or more electrical queues for storing packets. For example, as described above, data storage 58 may include a variety of queues for communicating over each ring of the ring subnetwork 14, such as a transit queue for in-transit packets, a transmission queue for locally generated data packets, a reception queue for packets destined for the local node, and an add_MAC queue for locally generated control packets. As another example, data storage 58 may include a variety of queues for communicating over the star subnetwork 16, such as star transmit queue for sending locally generated traffic to the star subnetwork 16, a star receive queue to receive local traffic from the star subnetwork 16, a ring-to-star transit queue for packets that are pulled from the ring subnetwork 14 and forwarded onto the star subnetwork 16, a star-to-ring queue for packets that are received from the star subnetwork 16 and need to be forwarded on the ring subnetwork 14, and/or a control queue for sending control packets on the star subnetwork 18. In this respect, the queues for communicating over the star subnetwork 16 may need to be added to the RPR MAC layer.

Program data 62 primarily includes control and/or data packets, which are either received from other nodes 12 or locally generated. The exemplary ring/star node $12_a$ may store program data 62 in an appropriate queue of the data storage 58, depending on the source, destination, type, and/or priority of the packet. The ring/star node $12_a$ may then serve the various queues of data storage 58 according to scheduling and fairness algorithms. In this respect, the ring/star node $12_a$ will preferably give in-transit traffic priority over station traffic, such that in-transit packets are not lost due to buffer overflow.

Program logic 64 preferably comprises machine language instructions that may be executed or interpreted by processor 56 to carry out functions according to examples of the present invention, including the functions described with reference to the figures above. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 64 may be executable by the processor 56 to (a) receive via the first communication interface 52 a data packet on the ring subnetwork 14, (b) detect a failure on the ring subnetwork 14, (c) determine a new transmission path to the destination node $12_d$, (d) send the data packet along the new transmission path to the destination node $12_d$ via the first communication interface and/or the second communication interface 54.

As another example, the program logic 64 may be executable by the processor 56 to keep network topology information up to date. More particularly, the program logic 64 may be executable by the processor 56 to (i) notify the nodes 12 of the failure on the ring subnetwork 14, (ii) update network topology information based on a detected failure on the network, (iii) receive a notification of a failure on the ring network and update network topology information based on the notification, and/or (iv) detect that the ring/star node $12_a$ is disconnected from the star subnetwork 16, notify the nodes 12 that the ring/star node $12_a$ is disconnected from the star subnetwork 16, and then update network topology information in the ring/star node $12_a$ to reflect the disconnection from the star subnetwork $12_a$. The program logic 64 may be executable by the processor 56 to perform other functions as well.

Figure 5:
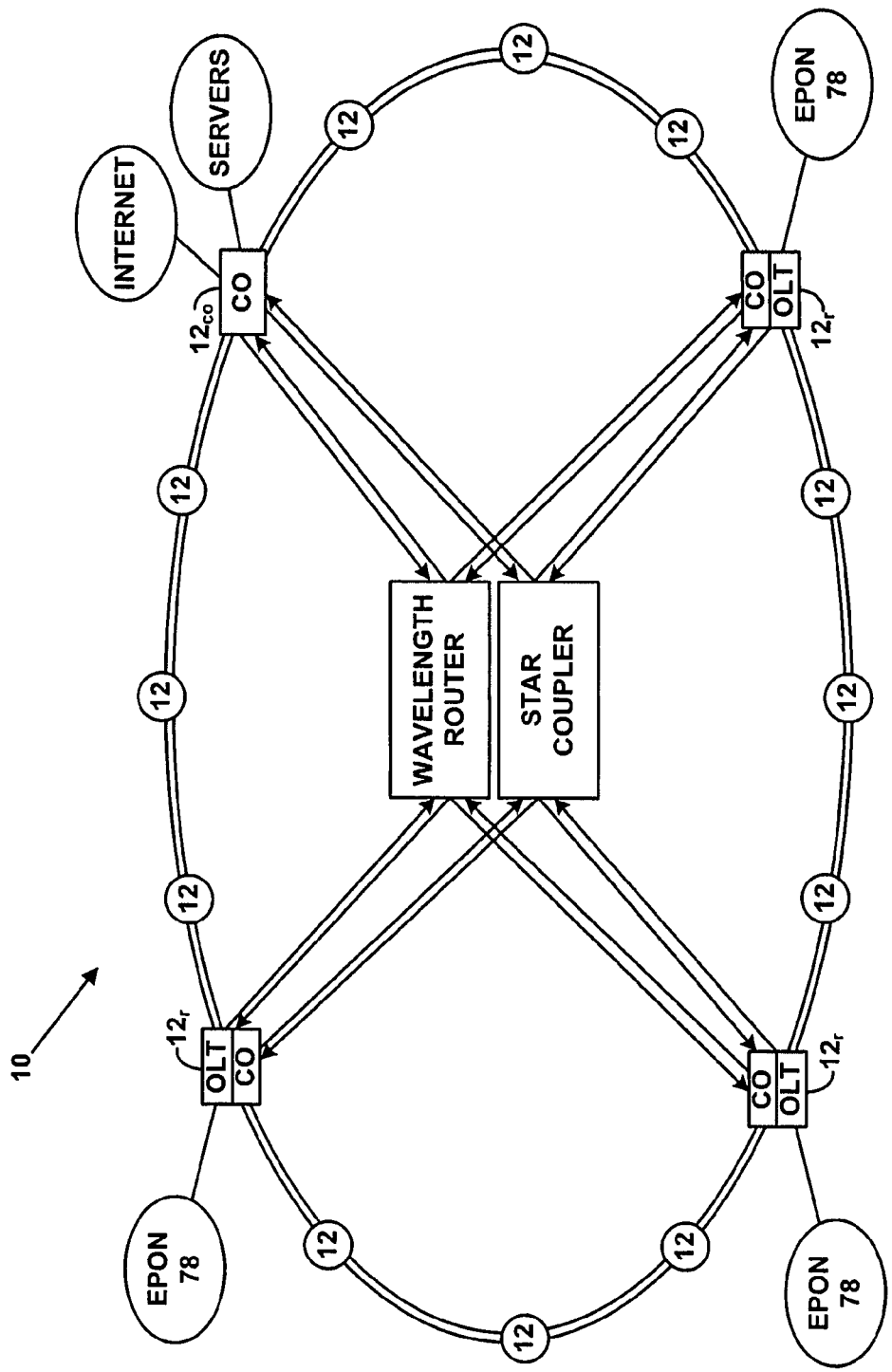
FIG. 5: Simplified block diagram of a second exemplary embodiment of the network of FIG. 1.

FIG. 5 is a simplified block diagram of a second exemplary embodiment of the network 10. In this second exemplary network 10, the ring subnetwork 14 will be an exemplary RPR network 74, and the star subnetwork 16 will be a second exemplary single-hop WDM star subnetwork 76. Further, in this second exemplary network 10, one or more of the ring/star nodes $12_a$ may be a root of an Ethernet passive optical network (EPON) 78, and preferably a WDM EPON.

The exemplary RPR network 74 may be substantially similar to the RPR network 24 described with reference to FIG. 2, except that the nodes 12 on the RPR network 74 may differ. Further, the second exemplary single-hop WDM star subnetwork 76 may be a simplified version of the first exemplary single-hop WDM star subnetwork 26. More particularly, similar to the first exemplary single-hop WDM star subnetwork 26, the second exemplary single-hop WDM star subnetwork 76 may include a central hub that consists of a wavelength router (e.g., an athermal D×D AWG) in parallel with a star coupler (e.g., a PSC). However, the second exemplary single-hop WDM star subnetwork 76 may not require any of the additional components of the first exemplary single-hop WDM star subnetwork 26 (e.g., combiners/splitters, waveband (de)partitioners, etc.).

The second exemplary single-hop WDM star subnetwork 76 may interconnect the roots of the EPONs $12_r$, as well as one "hot spot" central office $12_{co}$ that may connect to the Internet and/or server farms. In this respect, as shown, each root $12_r$ may be attached to a separate input/output port of the second exemplary single-hop WDM star subnetwork 76 by means of two pairs of counterdirectional fiber links. Each fiber going to and coming from the wavelength router carries wavelength channels in the wavelength router waveband. Similarly, each fiber going to and coming from the star coupler carries wavelength channels in the star coupler waveband (e.g., including the control wavelength channel).

Figure 6:
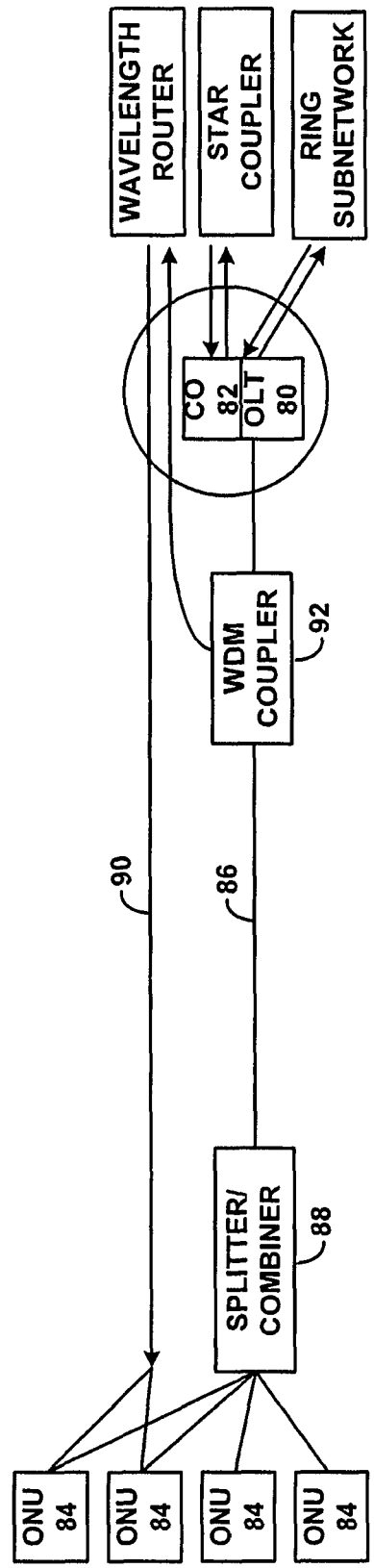
FIG. 6: Simplified block diagram of an exemplary embodiment of one of the Ethernet passive optical networks of FIG. 5.

FIG. 6 is a simplified block diagram of an exemplary embodiment of one of the EPONs 78. As shown, the EPONs 78 may have a physical tree topology. The root $12_r$ of each EPON 78 may include an optical line terminal (OLT) 80 that is co-located with a central office (CO) 82. The OLT 80 may be a device that interfaces a MAN with the EPON 78, and as such the OLT may serve as a point of origination in the EPON 78. The OLT 80 of the EPON 78 may couple to N optical network units (ONUs) 84 through a fiber link 86 and an optical splitter/combiner 88. ONUs are fiber termination devices that interface fiber links with subscribers. Assuming the EPON 78 is a WDM system, the OLT 80 may then communicate with the ONUs 84 over multiple upstream (i.e., from the ONUs 84 to the OLT 8–) and downstream (i.e., from the OLT 80 to the ONUs 84) wavelength channels on the fiber link 86. In this respect, the OLT 80 may include a DBA algorithm module for calculating the upstream transmission schedule of ONUs 84.

Each EPON 78 may deploy an additional point-to-multipoint (P2MP) and/or point-to-point (P2P) downstream fiber link 90 from the root node to a subset of the ONUs 84. As described in more detail below, the fiber link 86 may carry wavelength channels going upstream from the ONUs 84 to the wavelength router of the star subnetwork, while the additional downstream fiber link 90 may carry the wavelength channels coming downstream from the wavelength router star subnetwork to the ONUs 84.

Each of the EPONs 78 may further include a WDM coupler 92 on the fiber link 86 between the OLT 80 and the optical splitter/combiner 88. The WDM coupler 92 may be any optical device capable of wavelength dividing two wavebands on a single optical fiber into two optical fibers. In this respect, the WDM coupler 92 may be similar to the waveband partitioner described above. As such, the WDM coupler 92 may function to separate the upstream wavelength channels that are within the wavelength router's waveband from the other wavelength channels of the EPON 78. In turn, the WDM coupler 92 may guide the upstream wavelength channels that are within the wavelength router's waveband directly to the wavelength router (these wavelength channels may be optically amplified if necessary). As such, the upstream wavelength channels within the wavelength router's waveband may optically bypass the OLT 80 and the CO 82 at the root 12$_r$ of the EPON 78 and pass directly to the wavelength router. Similarly, the downstream wavelength channels coming from the wavelength router may travel on the additional fiber link 90 directly to the subset of ONUs 84 attached to the additional fiber link 90, thus allowing these downstream wavelength channels to optically bypass the OLT 80 and the CO 82 at the root 12$_r$ of the EPON 78.

As a result of the network configuration described above, network devices capable of communicating on the wavelength channels of the wavelength router, including the ONUs 84 connected to the additional fiber links 90 and the hot-spot CO 12$_{co}$, may communicate all-optically with each other in a single hop across the wavelength router of the second exemplary single-hop WDM star subnetwork 76. In this respect, the second exemplary single-hop WDM star subnetwork 76 may form a "gate" for all-optically interconnecting multiple WDM EPONs. Advantageously, the present network configuration may then allow EPONs to increase the number of ONUs 84, and thus the number of subscribers, without requiring additional OEO conversion at the OLT 80, which is costly.

The operation of the second exemplary network 10 will now be described with reference to FIGS. 5 and 6. In each EPON 78, the ONUs 84 may initiate the discovery and registration process by sending the OLT 80 a registration request message, such as REGISTER REQ message according to a MultiPoint Control Protocol (MPCP). This registration request message may carry information about the ONU 84, including its MAC address and its WDM node structure. In turn, by receiving the registration request messages, the OLT 80 may learn about its attached ONUs 84.

After registration, the OLTs 80 of the second exemplary network 10 may exchange, via the star coupler of the second exemplary single-hop WDM star subnetwork 76, information (e.g., MAC addresses) about attached ONUs 84 that are capable of receiving packets over the wavelength router. As a result, the OLTs 80 may obtain information regarding which MAC addresses can be reached via the wavelength router, which wavelength router output ports the corresponding ONUs 84 are attached to, and in turn which wavelength channels the ONUs 84 can be reached on from a given wavelength router input port.

After registration, the ONUs 84 may send a reporting message to its OLT 80, such as a REPORT MPCP message, to report the ONU's bandwidth requirements (e.g., queue occupancies). This reporting message may carry one or more queue sets (each set including up to eight queues). As such, the ONUs 84 may use a first queue set to report bandwidth requirements on upstream wavelength channels for transmission to the OLT. Additionally, to report bandwidth requirements on any of the wavelength channels of the wavelength router to a device located outside the local EPON 78, a given ONU 84 may use an additional queue set of the reporting message. In this respect, the given ONU 84 may include a MAC address of a destination device (e.g., another ONU) in the reporting message and then sends it to the OLT 80. As such, the bandwidth requirements for the wavelength router ride piggyback on the bandwidth requirements for the OLT wavelength channels within the same reporting message.

After the OLT 80 receives the reporting message and determines an upstream transmission schedule for its ONUs 84, the OLT 80 may issue transmission grants to the ONUs. In this respect, the OLT 80 may send a GATE MPCP message (e.g., a WDM extended GATE) to (i) coordinate the upstream transmission on the wavelength channels of the OLT 80 within the EPON 78, and (ii) coordinate the all-optical transmission on any of the wavelength channels of the wavelength router across the star subnetwork 76 between two ONUs 84 residing in different EPONs 78 (provided both ONUs 84 support the wavelength router channels). Based on the MAC address of the destination ONU 84 carried piggyback in a reporting message, the OLT 80 of the source EPON 78 may use an extended GATE message (i.e., STARGATE message) to grant the source ONU 84 a time window on the wavelength channel during which the wavelength router may route to the destination ONU 84. In this respect, each OLT 80 may use its DBA module to provide gated service across the star subnetwork 76.

ONUs 84 that are not capable of communicating directly across the star subnetwork 76 may send packets via the tree network of the EPON 78 to the ring subnetwork 74 and/or the star subnetwork 76. In turn, the ring subnetwork 74 and/or the star subnetwork 76 handle the packets according to the methods described above.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for handling data in a given node of a plurality of nodes in a network, the method comprising:
   receiving, in a given node coupled to a plurality of nodes via a ring subnetwork and to a subset of the plurality of nodes via a star subnetwork having a central wavelength router, data sent from a source node to a destination node;
   detecting a given failure on the ring subnetwork by determining that the data has undergone wrapping in the ring subnetwork based on a source of the data, a destination of the data, and a direction on the ring subnetwork from which the data arrived;
   in response to detecting the given failure, determining a new transmission path to the destination node, wherein the new transmission path includes both of the ring subnetwork and the star subnetwork; and
   sending the data along the new transmission path to the destination node.

2. The method of claim 1, wherein determining the new transmission path to the destination node comprises recomputing a shortest path to the destination node taking the given failure into account.

3. The method of claim 1, further comprising:
   notifying the plurality of nodes in the network of the given failure on the ring subnetwork.

4. The method of claim 1, further comprising:
   updating network topology information based on the given failure on the ring subnetwork.

5. The method of claim 4, wherein the network topology information is maintained in a topology database.

6. The method of claim 1, further comprising:
   receiving, in the given node, a notification of another failure on the ring subnetwork; and
   updating network topology information based on the notification.

7. The method of claim 1, further comprising:
   receiving, in the given node, a notification of another failure on the star subnetwork; and
   updating network topology information based on the notification.

8. Program instructions stored in data storage and executable by a processor to carry out the method of claim 1.

9. A network node comprising:
a first communication interface configured to couple to a plurality of nodes via a ring subnetwork;
a second communication interface configured to couple to a subset of the plurality of nodes via a star subnetwork having a wavelength router;
data storage;
a processor; and
program instructions stored in the data storage and executable by the processor to carry out functions including:
receiving data sent from a source node to a destination node;
detecting a given failure on the ring subnetwork by determining that the data has undergone wrapping in the ring subnetwork based on a source of the data, a destination of the data, and a direction on the ring subnetwork from which the data arrived;
in response to detecting the given failure, determining a new transmission path to the destination node, wherein the new transmission path includes both of the ring subnetwork and the star subnetwork; and
sending the data along the new transmission path to the destination node.

10. The network node of claim 9, wherein the data storage comprises:
one or more ring queues for data communicated on the ring subnetwork;
one or more star queues for data communicated on the star subnetwork; and
one or more ring-star queues for data communicated between the ring subnetwork and the star subnetwork.

11. The network node of claim 9, wherein the ring subnetwork comprises a Resilient Packet Ring (RPR) network.

12. The network node of claim 9, wherein the star subnetwork comprises a single-hop WDM star network.

13. The network node of claim 12, wherein the single-hop WDM star network comprises:
at least one combiner coupled to the second communication interface;
at least one splitter coupled to the second communication interface;
a central star coupler coupled in parallel with the central wavelength router;
a waveband partitioner coupling the at least one combiner to the central wavelength router and the central start coupler; and
a waveband departitioner coupling the at least one splitter to the central wavelength router and the central start coupler.

14. A network comprising:
a plurality of nodes;
a ring subnetwork coupling the plurality of nodes; and
a star subnetwork coupling a subset of the plurality of nodes, wherein the star subnetwork comprises:
at least one combiner coupled to the subset of the plurality of nodes;
at least one splitter coupled to the subset of the plurality of nodes;
a central hub comprising a wavelength router coupled in parallel with a star coupler;
a waveband partitioner coupling the at least one combiner to the central hub; and
a waveband departitioner coupling the at least one splitter to the central hub,
wherein each node in the subset of the plurality of nodes is configured to (a) receive data sent from a source node to a destination node, (b) detect a failure on the ring subnetwork, (c) in response to detecting the failure, determine a new transmission path to the destination node, wherein the new transmission path includes both of the ring subnetwork and the star subnetwork, and (d) send the data along the new transmission path to the destination node.

15. An Ethernet passive optical network (EPON) comprising:
a given root node comprising an optical line terminal (OLT), wherein the given root node is coupled to a respective root node of a plurality of other EPONs via a ring subnetwork and a star subnetwork having a central wavelength router;
a plurality of optical network units (ONUs), wherein the plurality of ONUs are coupled to the OLT of the given root node via an optical splitter/combiner and a first fiber link; and
a wave-division multiplexing (WDM) coupler coupled on the first fiber link between the OLT of the given root node and the optical splitter/combiner, wherein the WDM coupler is configured to separate a first waveband of wavelength channels from a second waveband of wavelength channels and responsively guide the first waveband of wavelength channels from the optical splitter/combiner to the central wavelength router of the star subnetwork without passing through the OLT of the given root node.

16. The EPON of claim 15, wherein the WDM coupler is further configured to forward the second waveband of wavelength channels to one of the star subnetwork and the ring subnetwork via the OLT of the given root node and the first fiber link.

17. The EPON of claim 15, wherein the first waveband of wavelength channels comprises wavelength channels of the central wavelength router.

18. The EPON of claim 15, further comprising:
a second fiber link coupled between the central wavelength router of the star subnetwork and a subset of the plurality of ONUs and configured to carry downstream traffic from the central wavelength router of the star subnetwork to the subset of the plurality of ONUs without passing through the OLT of the given root node.

19. The EPON of claim 18, wherein the third fiber link comprises one of a point-to-multipoint (P2MP) and a point-to-point (P2P) downstream fiber link.

* * * * *